United States Patent
Ananthanarayanan et al.

(10) Patent No.: US 9,860,333 B2
(45) Date of Patent: *Jan. 2, 2018

(54) SCALABLE CACHING OF REMOTE FILE DATA IN A CLUSTER FILE SYSTEM

(71) Applicant: International Business Machines Corporation, Armonk, NY (US)

(72) Inventors: Rajagopal Ananthanarayanan, San Jose, CA (US); Marc M. Eshel, San Jose, CA (US); Roger L. Haskin, Morgan Hill, CA (US); Dean Hildebrand, San Jose, CA (US); Manoj P. Naik, San Jose, CA (US); Frank B. Schmuck, Campbell, CA (US); Renu Tewari, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 14 days.

This patent is subject to a terminal disclaimer.

(21) Appl. No.: 14/822,284

(22) Filed: Aug. 10, 2015

(65) Prior Publication Data

US 2015/0350366 A1 Dec. 3, 2015

Related U.S. Application Data

(63) Continuation of application No. 12/639,832, filed on Dec. 16, 2009, now Pat. No. 9,158,788.

(51) Int. Cl.
  *G06F 15/16* (2006.01)
  *H04L 29/08* (2006.01)
  *G06F 17/30* (2006.01)

(52) U.S. Cl.
  CPC .... *H04L 67/2842* (2013.01); *G06F 17/30224* (2013.01)

(58) Field of Classification Search
  CPC ........................ G06F 17/30224; H04L 67/2842
  (Continued)

(56) References Cited

U.S. PATENT DOCUMENTS

| | | |
|---|---|---|
| 5,175,852 A | 12/1992 | Johnson et al. |
| 5,781,757 A | 7/1998 | Deshpande |

(Continued)

OTHER PUBLICATIONS

Batsakis, A. et al., "NFS-CD: Write-Enabled Cooperative Caching in NFS," IEEE Transactions on Parallel and Distributed Systems, Mar. 2008, pp. 323-333, vol. 19, No. 3, IEEE Computer Society, United States.

(Continued)

*Primary Examiner* — Joseph Greene
(74) *Attorney, Agent, or Firm* — Sherman IP LLP; Kenneth L. Sherman; Steven Laut

(57) ABSTRACT

A system facilitates access to data in a network. One implementations includes a caching layer function that is configured to integrate into a local cluster file system, to cache local file data in a cache based on fetching file data on demand from a remote cluster file system, and to operate on a multi-node cache cluster. The cache is visible to file system clients as a Portable Operating System Interface (POSIX) compliant file system, applications execute on the multi-node cache cluster using POSIX semantics via a POSIX compliant file system interface, and data cache is locally consistent for updates made at the multi-node cache cluster using distributed locking for the data cache.

20 Claims, 7 Drawing Sheets

(58) Field of Classification Search
USPC .......................................... 709/217–219, 201
See application file for complete search history.

(56) References Cited

U.S. PATENT DOCUMENTS

| | | | |
|---|---|---|---|
| 5,884,046 | A | 3/1999 | Antonov |
| 5,909,540 | A | 6/1999 | Carter et al. |
| 5,940,841 | A | 8/1999 | Schmuck et al. |
| 6,012,085 | A | 1/2000 | Yohe et al. |
| 6,023,706 | A | 2/2000 | Schmuck et al. |
| 6,122,629 | A | 9/2000 | Walker et al. |
| 6,192,408 | B1 | 2/2001 | Vahalia et al. |
| 6,219,693 | B1 | 4/2001 | Napolitano et al. |
| 6,490,615 | B1 | 12/2002 | Dias et al. |
| 6,535,970 | B1 | 3/2003 | Bills et al. |
| 6,675,264 | B2 | 1/2004 | Chen et al. |
| 6,816,891 | B1 | 11/2004 | Vahalia et al. |
| 6,938,039 | B1 | 8/2005 | Bober et al. |
| 6,950,833 | B2 | 9/2005 | Costello et al. |
| 6,965,972 | B2 | 11/2005 | Nanda et al. |
| 7,043,478 | B2 | 5/2006 | Martin et al. |
| 7,092,976 | B2 | 8/2006 | Curran et al. |
| 7,103,616 | B1 | 9/2006 | Harmer et al. |
| 7,165,096 | B2 | 1/2007 | Soltis |
| 7,167,921 | B1 | 1/2007 | Ben-Zvi |
| 7,177,270 | B2 | 2/2007 | Sim et al. |
| 7,312,945 | B2 | 12/2007 | Langlois et al. |
| 7,376,796 | B2 | 5/2008 | Corbett et al. |
| 7,395,258 | B2 | 7/2008 | Altinel et al. |
| 7,454,653 | B2 | 11/2008 | Nicholson et al. |
| 7,552,197 | B2 | 6/2009 | Soltis |
| 7,584,222 | B1 | 9/2009 | Georgiev |
| 7,631,078 | B2 | 12/2009 | Ackaouy et al. |
| 7,650,341 | B1 | 1/2010 | Oratovsky et al. |
| 7,685,128 | B2 | 3/2010 | Anderson et al. |
| 7,739,379 | B1 | 6/2010 | Vahalia et al. |
| 7,870,116 | B2 | 1/2011 | Olsen |
| 7,877,426 | B2 | 1/2011 | Grubbs et al. |
| 7,890,555 | B2 | 2/2011 | Gunda et al. |
| 7,899,917 | B2 | 3/2011 | Chitre et al. |
| 8,015,215 | B2 | 9/2011 | Coverston et al. |
| 8,046,422 | B2 | 10/2011 | Susarla et al. |
| 8,209,307 | B2 | 6/2012 | Erofeev |
| 2002/0059309 | A1* | 5/2002 | Loy .......................... G06F 9/542 |
| 2004/0139235 | A1 | 7/2004 | Rashid et al. |
| 2004/0193620 | A1 | 9/2004 | Cheng et al. |
| 2005/0091226 | A1 | 4/2005 | Lin et al. |
| 2005/0097300 | A1 | 5/2005 | Gildea et al. |
| 2005/0114291 | A1* | 5/2005 | Becker-Szendy . G06F 17/30067 |
| 2005/0144195 | A1 | 6/2005 | Hesselink et al. |
| 2005/0216695 | A1 | 9/2005 | Bono |
| 2006/0117018 | A1 | 6/2006 | Christiansen et al. |
| 2007/0179981 | A1 | 8/2007 | Vincent |
| 2007/0266108 | A1 | 11/2007 | Patterson et al. |
| 2008/0040450 | A1 | 2/2008 | Appleyard et al. |
| 2008/0071804 | A1 | 3/2008 | Gunda et al. |
| 2008/0120435 | A1* | 5/2008 | Moreira ............ G06F 17/30171 710/1 |
| 2009/0276431 | A1* | 11/2009 | Lind ........................ G06F 9/466 |
| 2010/0198576 | A1 | 8/2010 | Dessertenne |
| 2010/0235321 | A1 | 9/2010 | Shukla et al. |
| 2011/0119228 | A1 | 5/2011 | Menze et al. |
| 2011/0138131 | A1 | 6/2011 | Regni et al. |
| 2011/0145307 | A1 | 6/2011 | Ananthanarayanan et al. |
| 2011/0145363 | A1 | 6/2011 | Ananthanarayanan et al. |
| 2011/0145499 | A1 | 6/2011 | Ananthanarayanan et al. |
| 2012/0311065 | A1 | 12/2012 | Ananthanarayanan et al. |

OTHER PUBLICATIONS

Annapureddy, S. et al., "Shark: Scaling File Servers via Cooperative Caching," Proceedings of the 2nd Conference on Symposium on Networked Systems Design & Implementation (NSDI '05), 2005, pp. 129-142, USENIX Association, Boston, United States.

Gibson, G. et al., "Parallel NFS Requirements and Design Considerations," Internet Engineering Task Force (IETF) Internet—Draft, Oct. 2004, pp. 1-15, The Internet Society, United States.

Howard, J.H., "An Overview of the Andrew File System," Proceedings of the 1988 USENIX Winter Technical Conference, Feb. 1988, pp. 1-6, USENIX, United States.

Howard, J.H. et al., "Scale and Performance in a Distributed File System," ACM Transactions on Computer Systems (TOCS), Feb. 1988, pp. 51-81, vol. 6, No. 1, ACM, New York, United States.

Muntz, D. et al., "Multi-level Caching in Distributed File Systems—or—Your cache ain't nuthin' but trash," Proceedings of the USENIX Winter 1992 Technical Conference, 1992, pp. 305-313, USENIX, San Francisco, United States.

Satyanarayanan, M. et al., "Coda: A Highly Available File System for a Distributed Workstation Environment," IEEE Transactions on Computers, Apr. 1990, pp. 447-459, vol. 39, No. 4, IEEE Computer Society, United States.

Schmuck, F. et al., "GPFS: A Shared-Disk File System for Large Computing Clusters," Proceedings of the 1st USENIX Conference on File and Storage Technologies (FAST '02), 2002, pp. 231-244, No. 19, USENIX, United States.

Sivathanu, G. et al., "A Versatile Persistent Caching Framework for File Systems," Technical Report FSL-05-05, Dec. 2005, pp. 1-4, Stony Brook University, Stony Brook, NY, United States.

Howells, D., "FS-Cache: A Network Filesystem Caching Facility," Red Hat UK Ltd., Oct. 2004, pp. 1-14, Red Hat, United Kingdom.

IBM, "An Overview of OpenAFS Administration," OpenAFS Administration Guide, Apr. 2000, Chapter 1, pp. 1-6, IBM Corporation, United States.

Blue Coat Systems, "Proxy Caching Technology," located at URL: http://www.bluecoat.com/resources/technology/proxycachingtechnology, downloaded Dec. 14, 2009, pp. 1-6, Blue Coat Systems, Inc., United States.

Expand Networks, "Foundation WAN Optimization," located at URL: http://www.expand.com/generic-wanoptimization/generic-wan-optimization.aspx, download date Dec. 15, 2009, pp. 1-3, Expand Networks, United States.

Lee, Y.K. et al., "Metadata Management of the SANtopia File System," Proceedings of the Eighth International Conference on Parallel and Distributed Systems (ICPADS '01), 2001, pp. 492-499, IEEE, United States.

Zadok, E., et al., "On Incremental File System Development," ACM Transactions on Storage (TOS), May 2006, pp. 161-196, vol. 2, No. 2, ACM, New York, United States.

Yasuda, K., "Cache Cooperation for Clustered Disconnected Computers," Proceedings of the Ninth International Conference on Parallel and Distributed Systems (ICPADS '02), 2002, pp. 457-464, IEEE Computer Society, United States.

Mazer, M.S. et al., "Writing the Web While Disconnected," IEEE Personal Communications, Oct. 1998, pp. 35-41 vol. 5, No. 5, IEEE, United States.

Ananthanarayanan, R. et al., "Panache: A Parallel WAN Cache for Clustered Filesystems," ACM SIGOPS Operating Systems Review, Jan. 2008, pp. 48-53, vol. 42, No. 1, ACM, United States.

Boukerche, A. et al., "A Performance Analysis of a Cache-based File Prediction Protocol for Mobile File Systems," Proceedings of the ACM International Workshop on Performance Monitoring, Measurement, and Evaluation of Heterogeneous Wireless and Wired Networks ($PM^2HW^2N$ '06), 2006, pp. 100-104, ACM, United States.

Tang, H., et al., "A Self-Organizing Storage Cluster for Parallel Data-Intensive Applications," Proceedings of the 2004 ACM/IEEE conference on Supercomputing (SC '04), 2004, pp. 52-64, IEEE Computer Society, United States.

Shulman, A., "WAN Application Acceleration for LAN-like Performance," Applications Acceleration Challenge, Aug. 2005, pp. 1-3, Expand Networks and Webtorials, United States.

Liao, W. et al., "Cooperative Client-Side File Caching for MPI Applications", International Journal of High Performance Computing Applications, May 2007, pp. 144-154, vol. 21, No. 2, SAGE Publications, USA.

Farazdel, A. et al., "GPFS on AIX Clusters: High Performance File System Administration Simplified", IBM Redbooks, IBM Interna-

(56) References Cited

OTHER PUBLICATIONS tional Technical Support Organization, Aug. 2001, pp. 1-279, International Business Machines Corporation, USA.
U.S. Non-Final Office Action for U.S. Appl. No. 12/639,832 dated Oct. 11, 2012.
U.S. Final Office Action for U.S. Appl. No. 12/639,832 dated Mar. 26, 2013.
U.S. Non-Final Office Action for U.S. Appl. No. 12/639,832 dated Jul. 1, 2014.
U.S. Final Office Action for U.S. Appl. No. 12/639,832 dated Feb. 12, 2015.
U.S. Notice of Allowance for U.S. Appl. No. 12/639,832 dated May 8, 2015.
U.S. Supplemental Notice of Allowability for U.S. Appl. No. 12/639,832 dated Jun. 26, 2015.
U.S. Non-Final Office Action for U.S. Appl. No. 13/570,014 dated Dec. 6, 2012.
U.S. Final Office Action for U.S. Appl. No. 13/570,014 dated Jun. 26, 2013.
U.S. Non-Final Office Action for U.S. Appl. No. 13/570,014 dated Aug. 26, 2014.
U.S. Final Office Action for U.S. Appl. No. 13/570,014 dated Feb. 27, 2015.
U.S. Advisory Action for U.S. Appl. No. 13/570,014 dated May 7, 2015.
U.S. Notice of Allowance for U.S. Appl. No. 13/570,014 dated Jun. 22, 2015.
U.S. Non-Final Office Action for U.S. Appl. No. 12/639,865 dated Nov. 29, 2012.
U.S. Notice of Allowance for U.S. Appl. No. 12/639,865 dated Mar. 19, 2013.
U.S. Non-Final Office Action for U.S. Appl. No. 13/570,052 dated Nov. 27, 2012.
U.S. Notice of Allowance for U.S. Appl. No. 13/570,052 dated Apr. 12, 2013.
U.S. Non-Final Office Action for U.S. Appl. No. 12/639,904 dated Oct. 17, 2011.
U.S. Final Office Action for U.S. Appl. No. 12/639,904 dated Apr. 24, 2012.
U.S. Notice of Allowance for U.S. Appl. No. 12/639,904 dated Jun. 15, 2012.
U.S. Notice of Allowance for U.S. Appl. No. 12/639,904 dated Jan. 31, 2013.
U.S. Non-Final Office Action for U.S. Appl. No. 12/639,920 dated Dec. 19, 2011.
U.S. Final Office Action for U.S. Appl. No. 12/639,920 dated Jul. 10, 2012.
U.S. Notice of Allowance for U.S. Appl. No. 12/639,920 dated Feb. 21, 2013.

* cited by examiner

SCALABLE CACHING OF REMOTE FILE DATA IN A CLUSTER FILE SYSTEM

BACKGROUND

The present invention relates generally to an information technology (IT) environment. In particular, the present invention relates to cluster file systems.

In information technology (IT) environments such as large engineering design systems, complex scientific applications, and multinational enterprises all require sharing of massive amounts of file data in a consistent, efficient, and reliable manner across a wide-area network (WAN). Accessing file data across a wide area network, a WAN data storage system needs to scale both in capacity and access bandwidth to support a large number of clients, and mask latency and intermittent connectivity for WAN access. While large clustered file systems can scale to peta bytes of storage and hundreds of GB/s of access bandwidth, such clustered file systems cannot mask the latency and fluctuating performance across a WAN. Replicating data closer to the client or the point of computation is one way to reduce WAN accesses times. However, replication is undesirable when data sets are large and access patterns are not known a priori.

SUMMARY

Facilitating access to data in a network is provided. One embodiment involves maintaining a cache in a local cluster file system and caching local file data in the cache, by fetching file data from multiple nodes on demand from the remote cluster file system into the local cached file system over the network. The local file data corresponds to remote file data in the remote cluster file system and local updates.

Caching may further involve, upon detecting that a requested file data is not in the cache, fetching file data on demand from the remote cluster file system into the local cached cluster file system over the network. Locally updated file data may be transferred from the cache to the remote cluster file system over the network. Caching local file data in the cache may further include an application node of the local cached file system receiving a request for file access. The application node checks the cache for the requested file, and upon detecting a cache hit the application node accesses the file data in the cache.

Caching local file data in the cache may further include, upon detecting a cache miss, fetching file data on demand from the remote cluster file system into the local cached file system over the network. The fetching process may involve the application node signaling a gateway node to fetch the file data, and the gateway node fetching the file data from the remote cluster file system into the cache over the network for access by the application node.

Fetching the file data from the remote cluster file system may further include fetching the file data from the remote cluster file system into the cache over a wide area network using parallel network file system data transfer. The local cluster filer system and the remote cluster file system may comprise General Parallel File Systems. The cache may comprise a storage subsystem of the local cluster. The cache may be visible to any file system client as a Portable Operating System Interface compliant file system, allowing a file system client to browse the cache and access the cached remote file data as in a local file system.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments for caching of remote file data in an information technology (IT) computing environment, including multiple computing resources, as well as operation and/or component parts thereof. While the following description will be described in terms of caching of remote file data for clarity and placing the invention in context, it should be kept in mind that the teachings herein may have broad application to all types of systems, devices and applications.

A caching cluster file system that implements caching of remote file data in a cluster file system is provided. The system caches data on demand while guaranteeing well defined file system consistency semantics. A preferred embodiment provides a scalable cache architecture for a cache in a file system to cache remote file system data while providing the consistency semantics of a distributed file system. The scalable caching architecture enables the file system to cache remote file system data wherein the cache can scale in capacity and bandwidth similar to a clustered file system. Further, such a cache can support a remote server file system from different vendors. The cached data can be exported and accessed transparently by a file system client for both read and write access. The cache utilizes open, standard protocols for over-the-wire file access. Further the cache can significantly mask network latency and continue to function with network outages.

In an example implementation described below, the scalable caching architecture is integrated with a General Parallel File System (GPFS) clustered file system. The remote data is accessed over a network file system (NFS) so that any remote server exporting data over NFS can be the caching target. To get better performance, the cache can switch to a parallel NFS (pNFS) for data transfer if the remote system exports the data using pNFS. The cache is visible to any file system client as a Portable Operating System Interface (POSIX) compliant file system, thus any file system client can browse the cache and access the data as if it was in a local file system. The cached data can be further exported via NFS to a remote NFS client. NFS can also be substituted by the CIFS (Common Internet file system) protocol.

Figure 1:
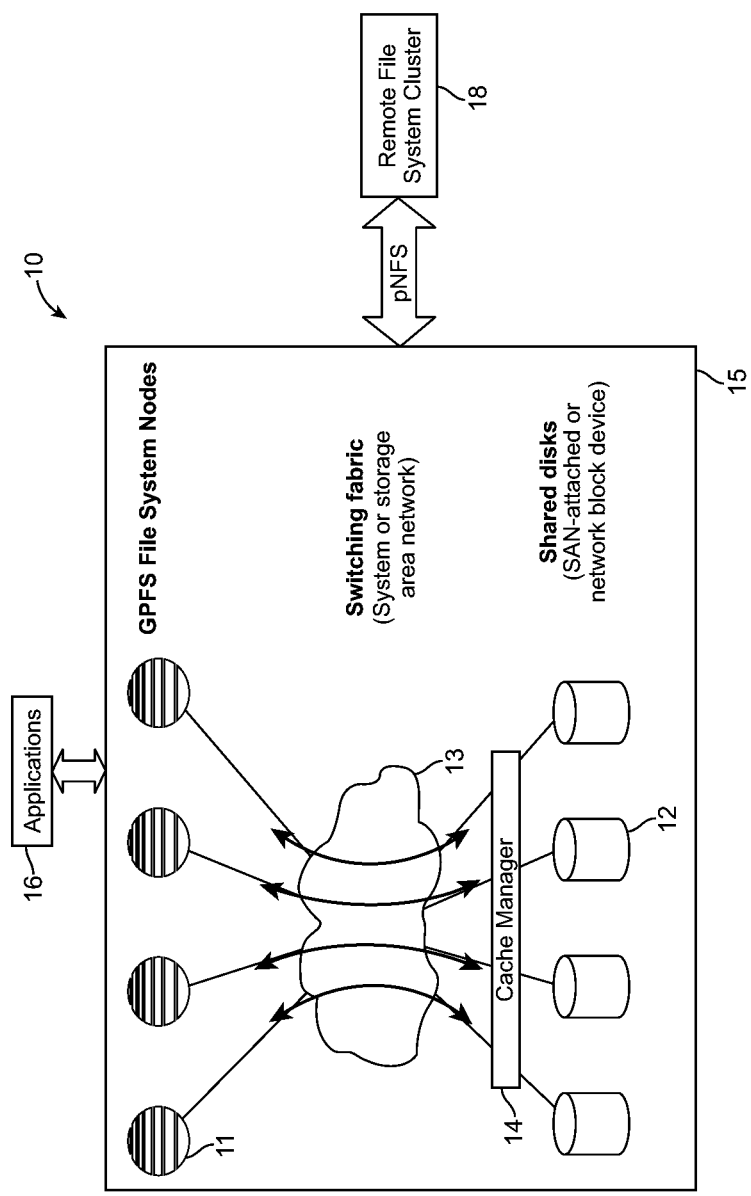
FIG. 1 illustrates a functional block diagram of a system for caching of remote file data in a local cluster file system.

Referring to FIG. 1, a GPFS parallel cluster file system 10 comprising a local cached file system cluster 15 that stores cached data, wherein pNFS is used to move the data between the cluster 15 and a remote cluster file system 18. GPFS is used for both file system clusters 15 and 18, to provide concurrent high-speed file access across multiple file system computing nodes of a cluster. The cached cluster includes the file system 15, computing nodes 11 (e.g., processors) that support the GPFS file system and the applications 16 that use it. The nodes 11 are connected to storage media 12, such as shared disks or disk subsystems, over a switching fabric 13. A cache manager 14 maintains cached data in the storage media 12. All nodes 11 in the cluster have equal access to all disk 12. Files are striped across all disks 12 in the file system where the number of disks 12 can range from tens to several thousand disks. In addition to balancing the load on the disks, striping achieves the full throughput that a disk subsystem is capable of by reading and writing the blocks in parallel.

The switching fabric 13 that connects file system nodes 11 to the shared disks 12 may comprise a storage area network (SAN) such as fibre channel or iSCSI. Alternatively, individual disks 12 may be attached to some number of I/O server nodes that allow access from file system nodes 11 through a software layer running over a general-purpose communication network, such as IBM Virtual Shared Disk (VSD). Regardless of how shared disks 12 are implemented, the GPFS only assumes a conventional block I/O interface with no particular intelligence at the disks 13. Parallel read-write disk accesses from multiple nodes 11 in the cluster 15 are synchronized to prevent corruption of both user data and file system metadata. The cluster 15 uses distributed locking to synchronize access to shared disks 12. Wherein distributed locking protocols ensure file system consistency regardless of the number of nodes 11 that simultaneously read from and write to a file system on the disks 12 on behalf of an application 16, while at the same time allowing data migration parallelism to achieve maximum throughput.

For remote accesses over a wide area network (WAN), pNFS clients access storage devices in a remote cluster file system in parallel. This is achieved by separating the data and metadata paths, and by moving the metadata server out of the data path. As a result, each pNFS client can leverage the full aggregate bandwidth of the cluster file system. Using pNFS, clients can query the metadata server to determine the layout of how files are distributed across data servers. Layouts are maintained internally by the metadata server. Based on the file layout, the client is able to directly access the data servers in parallel. A pNFS client communicates with the data servers using a variety of storage access protocols, including NFSv4 and iSCSI/Fibre Channel. The pNFS specification allows for the addition of new layout distributions and storage access protocols, in addition to flexibility for implementation of the back-end storage system.

A more detailed description of a cached file system is described below.

Figure 2:
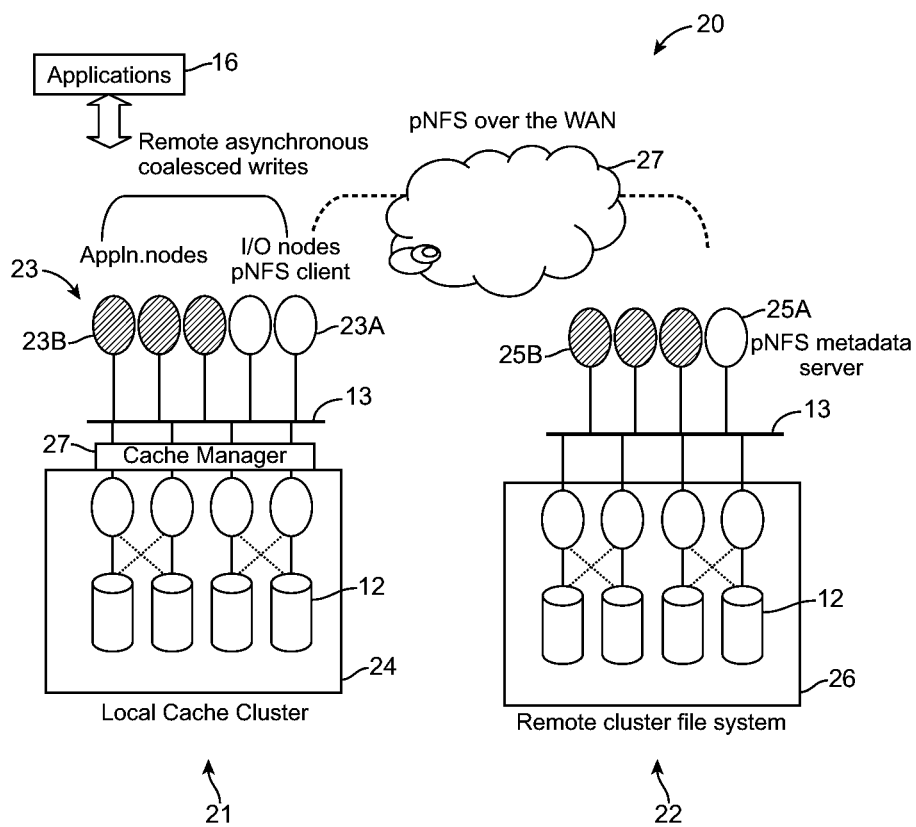
FIG. 2 illustrates a functional block diagram of a system for caching of remote file data in a cluster file system for an information technology (IT) environment.

FIG. 2 shows a functional block diagram of an IT system 20. The IT system 20 includes a local cache cluster 21 and a remote cluster file system 22. Every computing node 23 in the cache cluster 21 has the same access to data cached by a local cache file system 24 of the local cache cluster 21. However, only some of the nodes 23 (i.e., I/O nodes 23A) may have the hardware and software support for remote network connectivity. I/O nodes are also called gateway nodes. The I/O nodes 23A act as pNFS clients to fetch the data from the remote cluster 21. The remote cluster 21 may store the data in any POSIX-compliant cluster file system that is exported via pNFS (NFS may also be used but with a performance penalty). The I/O nodes 23A are responsible for reading the data from the remote cluster 21 and writing it to the local cache file system 24 and vice-versa. The other nodes of the cluster (i.e., application nodes 23B) service file access requests of applications 16, by reading and writing the cached data in the local cache file system (i.e., cache) 24. The remote file system 22 similarly includes I/O nodes 25A and application nodes 25B.

The application nodes 23B of the local cache file system 21 are also responsible for forwarding access requests by requesting applications 16 to the I/O nodes 23A (i.e., writes to be synchronized with a remote server node 25A of the remote file system 21, and reads to be fetched from the remote server 25A on a local cache miss).

The split between I/O and application nodes 23A, 23B in the local system 21 is conceptual and any node 23 in the local cluster 21 can function both as an I/O node or an application node based on its configuration. The I/O nodes 23A can be viewed as the edge of the cluster cloud that can communicate with the remote cluster 22 while the application nodes 23B interface with the applications.

To access the remote data consistently, the system 20 associates a cache state with every object in the local cache file system 24, wherein the cache state includes the NFS file handle and inode (e.g., data structure) attributes of the corresponding object in the remote file system 26. As multiple nodes 23 in the local system 21 can be accessing the cached data in the local cached file system 24, the accesses may be serialized by a standard GPFS distributed lock management with one of the nodes 23 being the token manager and issuing read and write tokens. The data can be concurrently written at the remote file system 26 of the remote cluster 22, and at the local cache file system 24 of the local cache cluster 21. Between the remote cluster 22 and the local cache cluster 21, the system 20 supports the well known close-to-open consistency guarantees provided by NFS. To reduce the frequent checking of cached attributes with the remote file system 26, the I/O nodes 23A leverage the read and write delegation support of NFSv4. With delegations, the pNFS server 25A of the remote cluster 22 can transfer the ownership of a file to the local cache cluster 21, so that the local cache cluster 21 can safely assume that the data is valid and service local requests.

A cache manager 27 integrated into local cache file system 24 intercepts the application file access requests, wherein the applications simply experience the local cache file system 24 as a traditional GPFS file system. The cache manager 27 of the local cluster 21 mimics the same namespace as the remote cluster 22. Thus browsing through the cache cluster 21 will show the same listing of directories and files as the remote cluster 22. The caching function can be further exported via NFS to enable access by NFS clients. Example file system operations are now described, including Open/Close operations, Data Read operations and Data Write operations.

Open/Close Operations

Figure 3:
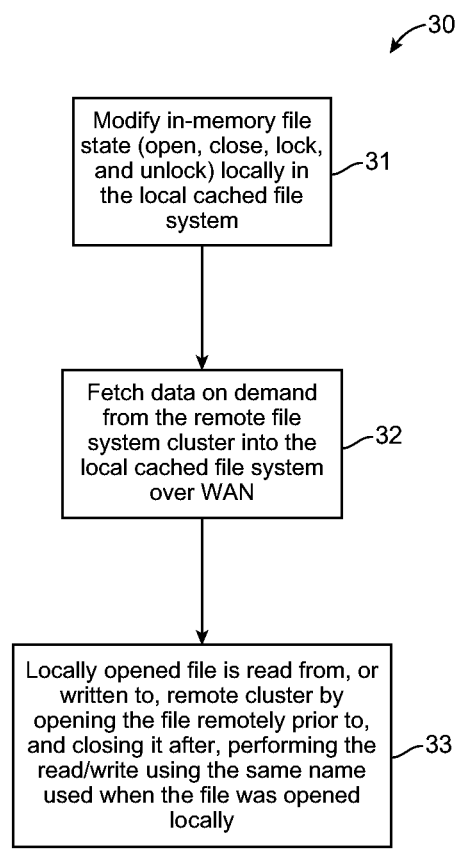
FIGS. 3-5 illustrate file access operations in a local cached file system cluster that is caching data for a remote cluster file system.

FIG. 3 illustrates an example open/close operation process 30. File operations that modify in-memory file state (e.g., open, close, lock, and unlock), are performed by the cache manager 27 locally in the local cached file system 24 without consulting the remote server 22 (block 31). The cache manager 27 functions as a file system, with the remote cluster 22 being primarily used as a source of data that is fetched on demand into the local cached file system 24 from the remote cluster 22 over WAN (block 32). When a locally opened file needs to be read from, or written to, the remote server 25A of the remote cluster 22, an I/O node 23A opens the file remotely prior to, and closes it after; performing the read/write using the same name used when the file was opened locally (block 33).

The files are typically read and written in their entirety using whole file caching and write coalescing, respectively. In a typical usage scenario, intersite conflicts are expected to be minimal and continued operation is required in the face of WAN outages (similar to an NFSv4 client handling of its file state in the presence of delegations).

The system allows disconnected operations, wherein user processes (applications) supported by the local cluster 21, may continue to function in the absence of network connectivity to the remote cluster 22.

Data Read Operations

Figure 4:
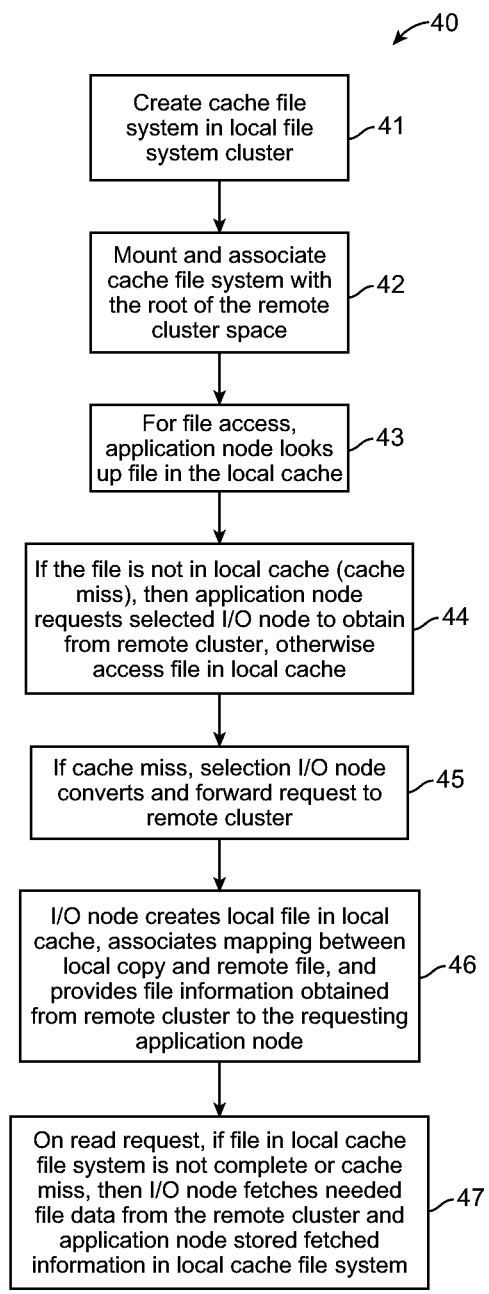

FIG. 4 illustrates an example data read operation process 40. The cache file system 24 is initially created in the local cluster 21, and contains no data (block 41). When mounted, the cache file system 24 is associated with the root of the remote cluster exported space using a mount operation (block 42). When an object such as a file is first accessed by an application node 23B of the local cluster 21, a result of a user-invoked opened on a file or a directory (i.e., via a GPFS lookup request), the cache manager 27 performs a (VFS) lookup or read directory (i.e., readdir) operation in the local cache 24 (block 43). If the object is not found in the local cache file system (as the case would be on a initialized cache file system), the application node 23B requests a selected I/O node 23A to service the request from the remote cluster 22 (block 44). The selection of I/O node 23A is based on a hashing function that ensures that requests for an object are always sent to the same I/O node 23A.

The selected I/O node 23A converts a GPFS lookup request to an NFS LOOKUP request and forwards it to the remote cluster 22 to obtain the file information (block 45). On success in obtaining file information from the remote cluster 22, the I/O node 23A creates the object in the local file system cache 24 via the cache manager 27, associates a mapping between the local GPFS inode and the remote cluster (or home cluster) state (the cache is local but it contains information of the remote object (object modification times, unique identifier, etc.)). The I/O node 23A provides the obtained file handle and attributes of the object to the application node 23B and returns success status back to the application node 23B (block 46). In effect, once the lookup operation completes successfully, the object would have been created in the local cache file system 24 but would not contain any data. The state associated with a cached object indicates if the object is incomplete or empty.

On an application read request, in block 47 the application node 23B first checks with the cache manager 27 to determine if the object exists in the local cache file system 24. If the object exists but is empty or incomplete (i.e., a cache miss), the application node 23B requests the designated I/O node 23A to fetch the data from the remote cluster 22. The I/O node 23A, based on a prefetch policy, fetches/retrieves the entire file or the requested bytes from the remote cluster 22 (via pNFS over WAN) and writes the fetched information in the local cache file system via the cache manager 27. If only a portion of the file (object) was retrieved from the remote cluster 22, then the rest of the file may be prefetched asynchronously after the application request is completed.

The system 20 supports both whole file and partial file caching (segments including a set of contiguous blocks). The application node 23B, when notified of completion, reads the requested bytes from the local cache 24 via the cache manager 27 and returns it to a requesting application 16 as if the requested data file (i.e., object) was present in the local cluster 21 all along. It should be noted that the I/O and application nodes 23A, 23B only exchange request and response messages while the actual data is accessed locally by the cache manager 27 via the shared disks 12. Thereafter, if said previously requested file (object) is read again, the application node 23B checks via the cache manager 27 if the complete valid object exists in the local cache 24. On a cache hit, the application node 23B can itself service the file read request from the local cache 24 via the cache manager 27. The system 20 uses file and directory attribute checking, performed by an NFS client at the I/O node 23A to guarantee close-to-open consistency of the data in the local cache 24 of the local cluster 21, with the file system 26 of the remote cluster 22. All the "read class" of requests which include lookup, get attribute (getattr) and read, follow a similar data flow. These requests can be considered synchronous on a cache miss, because the application is blocked waiting for the response back from the I/O node 23A.

Data Write Operations

Figure 5:
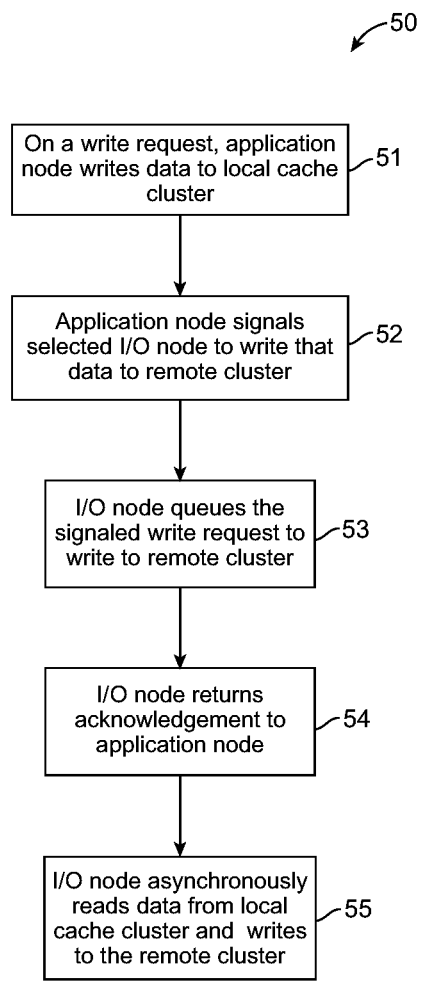

FIG. 5 illustrates an example data write operation process 50. On a write request, the application node 23B first writes the data to the local cache 24 via the cache manager 27 (block 51), and then sends a message to the designated I/O node 23A to perform the write operation at the remote cluster 22 (block 52). The I/O node 23A queues the request (block 53) and returns acknowledgement immediately, allowing the requesting application 16 (e.g., user process) to complete (block 54). At a later time, the I/O node 23A reads the data from the local cache 24 and completes the remote write asynchronously (block 55). The cache read provides better performance as it avoids both network latency and the limited WAN network bandwidth. The cache read provides better throughput and low latency as the data is locally resident. A remote write operation is sent as an NFS operation to the remote (or home) cluster where the data is written to the home cluster file system. This is performed for all "write class" of requests such as; create, make directory (mkdir), write and unlink. Since data modifying operations are performed asynchronously, optimizations such a write coalescing and elimination of transient creates may be performed.

As such, an implementation of a preferred embodiment of the system according to the invention comprises a remote file data caching module integrated with the GPFS cluster file system, providing a scalable, multi-node, consistent cache of data exported by a remote file system cluster. The example system uses the pNFS protocol to move data in parallel from the remote file cluster. Furthermore, the system provides a POSIX compliant file system interface, making the cache completely transparent to applications. The system can mask the fluctuating wide-area-network (WAN) latencies and outages by supporting asynchronous and disconnected-mode operations. The system allows concurrent updates to be made at the cache and at the remote cluster and synchronizes them by using conflict detection techniques to flag and handle conflicts. The system may rely on open standards for high-performance file serving and does not require any proprietary hardware or software to be deployed at a remote cluster.

The cache manager 27, gateway nodes 23A and application nodes 23B collectively provide a caching layer integrated into the local GPFS cluster file system 21 that can persistently and consistently store data and metadata exported by the remote cluster 22 across a wide-area network 27. Since every node 23 has direct access to cached data and metadata in the file system 24, once data is cached, applications 16 running on the cached cluster 21 achieve the same performance as if they were running directly on the remote cluster 22. Furthermore, NFS clients can access the cache 24 in cached cluster 21 and see the same view of the data (as defined by NFS consistency semantics) as NFS clients directly access the data from the remote cluster 22. In essence, both in terms of consistency and performance, applications 16 can function as if there was no cache 24 and WAN 27 in between the applications 16 and the remote cluster 22. More importantly, the caching layer 27 can function as a standalone file system cache. Thus applications 16 can run on the cache cluster 21 using POSIX semantics and access, update, and traverse the directory tree even when the remote cluster 22 is offline.

The caching layer 27 can operate on a multi-node cluster (henceforth called the cache cluster) where all nodes need not be identical in terms of hardware, operating system (OS), or support for remote network connectivity. The nodes 23B of the cache cluster 21 see a shared storage 24, either by connecting to SAN attached storage or relying on a Network Shared Disk layer that enables all nodes in a GPFS cluster to "access" direct attached storage on another node in the cluster, as if it were local. Only a set of designated I/O nodes 23A (Gateway nodes) need to have the hardware and software support for remote access to the remote cluster 22. The nodes 23A internally act as NFS/pNFS clients to fetch the data in parallel from the remote cluster 22. Parallel NFS can be used if the remote cluster file system 22 provides support, otherwise NFSv4 can be used. As noted, the remaining nodes 23B of the local cached cluster 21 called (Application nodes) service the data requests of applications 16 from the local caches cluster 21.

The I/O nodes 23A communicate with each other via internal remote procedure call (RPC) requests. As the application nodes 23B service data requests by the requesting applications 16, whenever an application request cannot be satisfied by the cache 24 (due to a cache miss or when the cached data is invalid), an application node 23B sends a read request to one of the I/O nodes 23A which accesses the data from the remote cluster 22 on behalf of the application node 23B.

Different mechanisms can be implemented for the I/O nodes 23A to share the data with the application nodes 23B. One option is for the I/O nodes to write the remote data to the shared storage 12, which application nodes can then access and return the data to the applications 16. Another option is for the I/O nodes to transfer the data directly to the application nodes using the cluster interconnect. In the first option, data sharing occurs through the storage subsystem 12, which can provide higher performance than a typical network link. All updates to the cache 24 are also made by the application nodes 23B via the cache manager 27 and a command message (again no data) is sent to the I/O node 23A and queued.

Figure 6:
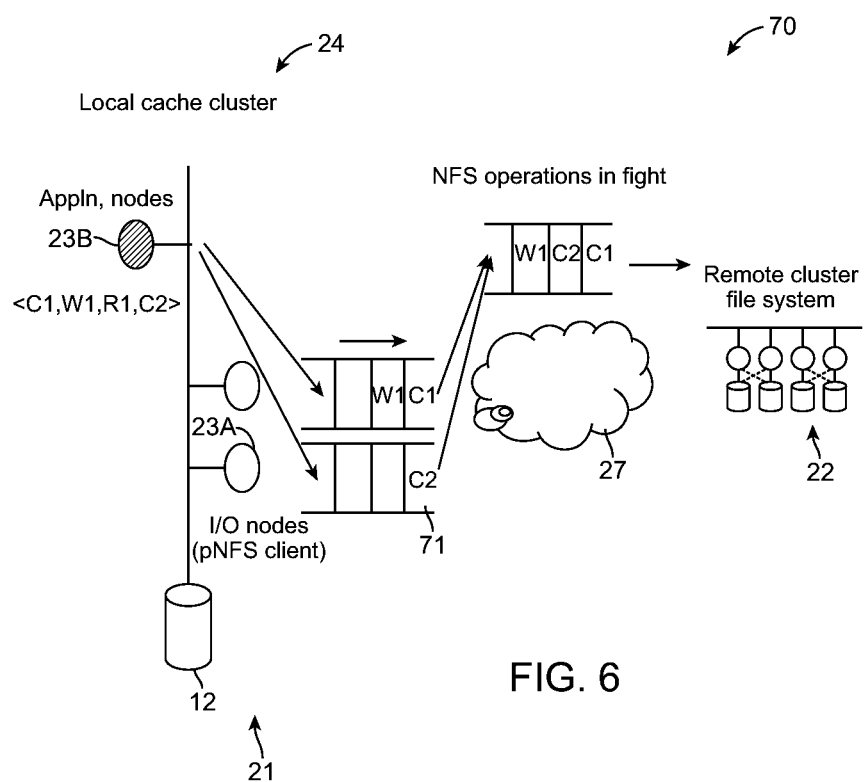
FIG. 6 illustrates build up of data access operation queues at gateway nodes of a local cached file system cluster.

FIG. 6 shows an example process 70 illustrating build up of queues 71 at the I/O nodes 23A for asynchronous requests sent by an application node 23B (i.e., create, write requests made at one of the application nodes 23B). These requests are queued at the designated I/O node 23A before being sent to remote cluster 22, wherein in FIG. 6 Ci, Ri and Wi indicate create, read and write for file i respectively. At a later time, the I/O node(s) 23A read the data in parallel from the storage subsystem 12 and push it to the remote cluster 22 over pNFS 27. The selection of an I/O node 23A to service a request ensures that dependent requests are executed in the intended order. To provide node affinity, as a first step, an application node 23B selects an I/O node 23A using a hash function based on a unique identifier of the object on which a file system operation is requested. Coordination for operations that are based on a name (e.g., lookup, create, remove etc.) and operations that affect multiple objects (e.g., rename, link), are provided. Each I/O node 23A maintains an in-memory queue of operations that need to be sent to the remote cluster 22. All the file system operations, from the point of view of the cache 24, fall into two classes: synchronous (i.e., those that require the request to block until the remote operation completes and returns, e.g., read, lookup), and asynchronous (i.e., those that can proceed without the remote operation completing, e.g., create, write). Each I/O node can delay asynchronous operations for a configurable durations of time.

Data consistency can be controlled across various dimensions and can be defined relative to the cache cluster 21, the remote cluster 22 and the network connectivity. The cached data in the cache 24 is considered locally consistent if a read from a node of the cache cluster 21 returns the last write from any node of the cache cluster 21. A validity lag is defined as the time delay between a read at the cache cluster 21 reflecting the last write at the remote cluster 22. A synchronization lag is defined as the time delay between a read at the remote cluster 22 reflecting the last write at the cache cluster 21.

Using GPFS distributed locking mechanism, the data cache is locally consistent for the updates made at the cache cluster 21. The accesses are serialized by electing one of the nodes 23 to be the token manager and issuing read and write tokens. Local consistency within the cache cluster 21 translates to the traditional definition of strong consistency. For cross-cluster consistency across the WAN 27, the local cluster 21 allows both the validity lag and the synchronization (or synch) lag to be tunable based on the workload requirements. Basic NFS close-to-open consistency can be achieved by setting the validity lag to zero on a file open (i.e., the data is always validated with the remote cluster 22 on an open command) and setting the synch lag to zero on a file close (i.e., cache writes are flushed to the remote cluster 22 on a close). NFS uses an attribute timeout value (typically 30 seconds) to recheck with the server if the file attributes have changed. The validity lag is bounded by this attribute timeout value or set explicitly as a parameter.

The synch lag can also be set to NFS semantics or set explicitly as a parameter. However, NFS consistency semantics can also be strengthened via the O DIRECT parameter (which disables NFS client caching) or by disabling attribute caching (effectively setting the attribute timeout value to 0). NFSv4 file delegations can reduce the overhead of consistency management by having the remote cluster 22 NFS/pNFS server transfer ownership of a file to the cache cluster 21 so that the cache 24 can safely assume that the data is valid and service local requests.

When the synch lag is greater than zero, all updates made to the cache 24 are asynchronously committed at the remote cluster 22. The semantics will no longer be close-to-open as data writes regardless of the file close time delay. When the network is disconnected both the validation lag and synch lag become indeterminate. When connectivity is restored, the cache and remote clusters are synchronized, with conflicts being detected and resolved.

Figure 7:
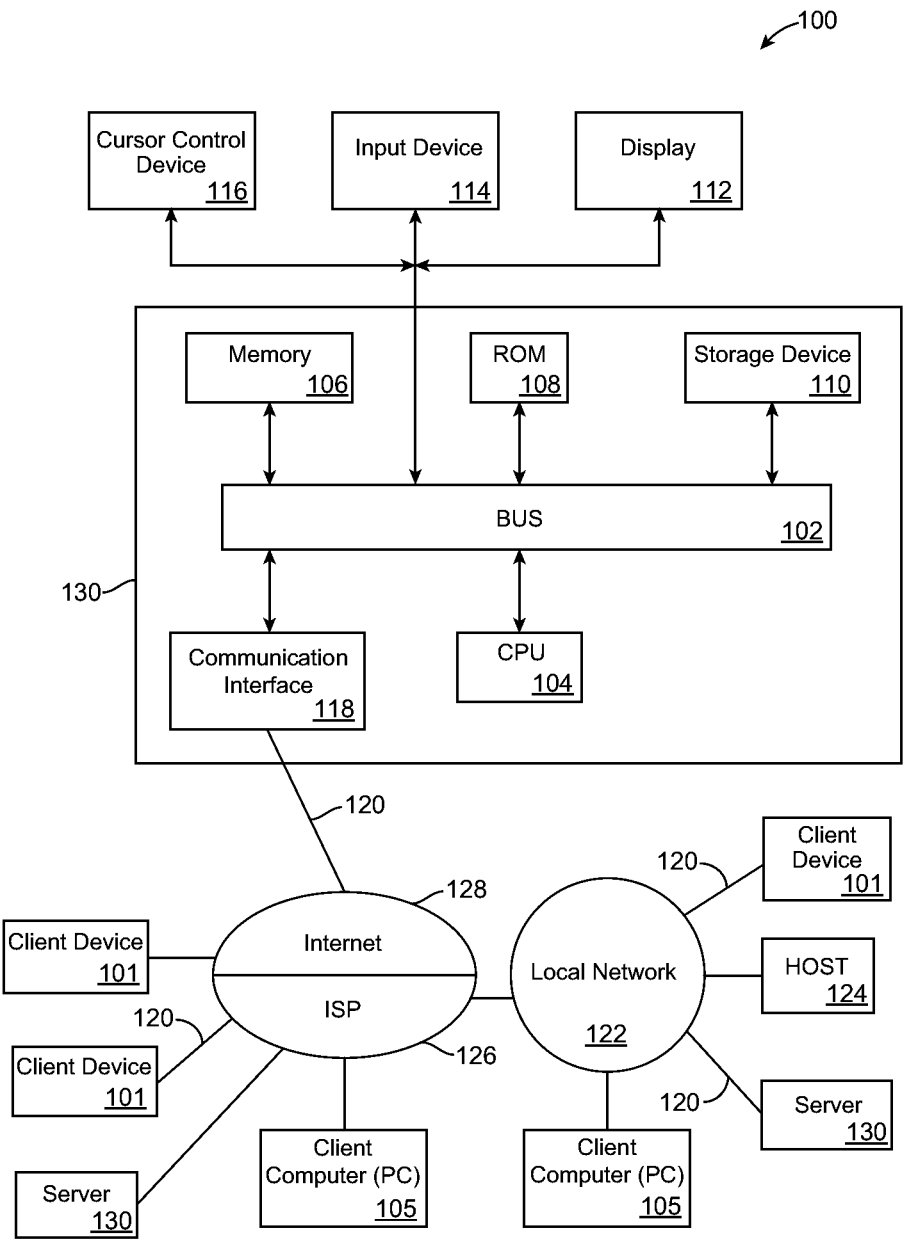
FIG. 7 illustrates a computing system for implementing an embodiment of the invention.

FIG. 7 shows a block diagram of an example architecture of an embodiment of a system 100. The system 100 includes one or more client devices 101 connected to one or more server computing systems 130. A server 130 includes a bus 102 or other communication mechanisms for communicating information, and a processor (CPU) 104 coupled with the bus 102 for processing information. The server 130 also includes a main memory 106, such as a random access memory (RAM) or other dynamic storage device, coupled to the bus 102 for storing information and instructions to be executed by the processor 104. The main memory 106 also may be used for storing temporary variables or other intermediate information during execution or instructions to be executed by the processor 104. The server computer system 130 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions. The bus 102 may contain, for example, thirty-two address lines for addressing video memory or main memory 106. The bus 102 can also include, for example, a 32-bit data bus for transferring data between and among the components, such as the CPU 104, the main memory 106, video memory and the storage 110. Alternatively, multiplex data/address lines may be used instead of separate data and address lines.

The server 130 may be coupled via the bus 102 to a display 112 for displaying information to a computer user. An input device 114, including alphanumeric and other keys, is coupled to the bus 102 for communicating information and command selections to the processor 104. Another type of user input device comprises cursor control 116, such as a mouse, a trackball, or cursor direction keys for communicating direction information and command selections to the processor 104 and for controlling cursor movement on the display 112.

According to one embodiment of the invention, the functions of the system 10 (FIG. 1) are performed by the server 130 in response to the processor 104 executing one or more sequences of one or more instructions contained in the main memory 106. Such instructions may be read into the main memory 106 from another computer-readable medium, such as the storage device 110. Execution of the sequences of instructions contained in the main memory 106 causes the processor 104 to perform the process steps described herein. One or more processors in a multi-processing arrangement may also be employed to execute the sequences of instructions contained in the main memory 106. In alternative embodiments, hard-wired circuitry may be used in place of or in combination with software instructions to implement the invention. Thus, embodiments of the invention are not limited to any specific combination of hardware circuitry and software.

The terms "computer program medium," "computer usable medium," "computer readable medium" and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information, from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor or multi-core processor to perform the features of the computer system. Accordingly, such computer programs represent controllers of the computer system.

Generally, the term "computer-readable medium" as used herein refers to any medium that participated in providing instructions to the processor 104 for execution. Such a medium may take many forms, including but not limited to, non-volatile media, volatile media, and transmission media. Non-volatile media includes, for example, optical or magnetic disks, such as the storage device 110. Volatile media includes dynamic memory, such as the main memory 106. Transmission media includes coaxial cables, copper wire and fiber optics, including the wires that comprise the bus 102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 104 for execution. For example, the instructions may initially be carried on a magnetic disk of a remote computer. The remote computer can load the instructions into its dynamic memory and send the instructions over a telephone line using a modem. A modem local to the server 130 can receive the data on the telephone line and use an infrared transmitter to convert the data to an infrared signal. An infrared detector coupled to the bus 102 can receive the data carried in the infrared signal and place the data on the bus 102. The bus 102 carries the data to the main memory 106, from which the processor 104 retrieves and executes the instructions. The instructions received from the main memory 106 may optionally be stored on the storage device 110 either before or after execution by the processor 104.

The server 130 also includes a communication interface 118 coupled to the bus 102. The communication interface 118 provides a two-way data communication coupling to a network link 120 that is connected to the world wide packet data communication network now commonly referred to as the Internet 128. The Internet 128 uses electrical, electromagnetic or optical signals that carry digital data streams. The signals through the various networks and the signals on the network link 120 and through the communication interface 118, which carry the digital data to and from the server 130, are exemplary forms or carrier waves transporting the information.

In another embodiment of the server 130, interface 118 is connected to a network 122 via a communication link 120. For example, the communication interface 118 may be an integrated services digital network (ISDN) card or a modem to provide a data communication connection to a corresponding type of telephone line, which can comprise part of the network link 120. As another example, the communication interface 118 may be a local area network (LAN) card to provide a data communication connection to a compatible LAN. Wireless links may also be implemented. In any such implementation, the communication interface 118 sends and receives electrical electromagnetic or optical signals that carry digital data streams representing various types of information.

The network link 120 typically provides data communication through one or more networks to other data devices. For example, the network link 120 may provide a connection through the local network 122 to a host computer 124 or to data equipment operated by an Internet Service Provider (ISP) 126. The ISP 126 in turn provides data communication services through the Internet 128. The local network 122 and the Internet 128 both use electrical, electromagnetic or optical signals that carry digital data streams. The signals through the various networks and the signals on the network link 120 and through the communication interface 118, which carry the digital data to and from the server 130, are exemplary forms or carrier waves transporting the information.

The server 130 can send/receive messages and data, including e-mail, program code, through the network, the network link 120 and the communication interface 118. Further, the communication interface 118 can comprise of a USB/Tuner and the network link 120 may be an antenna or cable for connecting the server 130 to a cable provider, satellite provider or other terrestrial transmission system for receiving messages, data and program code from another source.

The example versions of the invention described herein are implemented as logical operations in a distributed processing system such as the system 100 including the servers 130. The logical operations of the present invention can be implemented as a sequence of steps executing in the server 130, and as interconnected machine modules within the system 100. The implementation is a matter of choice and can depend on performance of the system 100 implementing the invention. As such, the logical operations constituting said example versions of the invention are referred to for e.g. as operations, steps or modules.

Similar to a server 130 described above, a client device 101 can include a processor, memory, storage device, display, input device and communication interface (e.g., e-mail interface) for connecting the client device to the Internet 128, the ISP 126, or LAN 122, for communication with the servers 130.

The system 100 can further include computers (e.g., personal computers, computing nodes) 105 operating the same manner as client devices 101, wherein a user can utilize one or more computers 105 to manage data in the server 130.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device. The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters. In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system for facilitating access to data in a network, comprising:
a cache storing instructions, the cache using distributed locking for data cache; and
a processor configured to execute the instructions comprising;
caching processing configured to:
integrate caching into a local cluster file system,
cache local file data in the cache based on fetching file data on demand from a remote cluster file system,
operate on a multi-node cache cluster; and
associate a cache state with every object in the multi-node cache cluster to access remote data consistently from the remote cluster file system;
wherein the cache is visible to file system clients as a Portable Operating System Interface (POSIX) compliant file system, applications execute on the multi-node cache cluster using POSIX semantics via a POSIX compliant file system interface, data cache is locally and remotely consistent for updates made at the multi-node cache cluster using the distributed locking for the data cache, and the cache state includes a network file system (NFS) file handle and inode attributes of a corresponding object in the remote file system.

2. The system of claim 1, wherein the processing further comprises a cache manager process that is configured to function as a file system with the remote cluster file system that is used as a source of data that is fetched on demand into the local cluster file system.

3. The system of claim 2, wherein upon accessing a locally opened file, the remote cluster file system is configured to open the file remotely prior to access, and closes the file after access, and is configured to perform a read or write using a same name used when the file was opened locally.

4. The system of claim 1, wherein the caching processing includes an application node configured to select an input/output (I/O) node based on a hashing function to ensure requests for an object are always sent to a same I/O node, and the selected I/O node is configured to convert a General Parallel File System (GPFS) lookup request to a network file system (NFS) lookup request and forwards the converted request to the remote cluster file system to obtain file information.

5. The system of claim 4, wherein the I/O node is configured to create the object in the cache via the cache manager process, to associate a mapping between a local GPFS inode and the remote cluster file system state, to provide an obtained file handle and attributes of the object to the application node, and to return a success status back to the application node.

6. The system of claim 5, wherein fetching file data on demand from the remote cluster file system occurs over the network, and the local file data corresponds to file data in the remote cluster file system.

7. The system of claim 6, wherein the applications are configured to access, update, and traverse a directory tree for the remote cluster file system even when the remote cluster file system is offline.

8. The system of claim 1, wherein the caching processing comprises a cache manager process, multiple gateway nodes and multiple application nodes, and the caching processing is integrated into a local General Parallel File System cluster file system.

9. A program product, the computer program product comprising a computer-readable hardware storage medium having program code embodied therewith, the program code being executable by a cache processor to implement a method for facilitating access to data, the method comprising:
providing, by the cache processor, a caching layer function that is configured to integrate into a local cluster file system, to cache local file data in a cache based on fetching file data on demand from a remote cluster file system, to operate on a multi-node cache cluster, to associate a cache state with every object in the multi-node cache cluster to access remote data consistently from the remote cluster file system, and to use distributed locking for data cache,
wherein the cache is visible to file system clients as a Portable Operating System Interface (POSIX) compliant file system, applications execute on the multi-node cache cluster using POSIX semantics via a POSIX compliant file system interface, the data cache is locally and remotely consistent for updates made at the multi-node cache cluster using the distributed locking for the data cache, and the cache state includes a network file system (NFS) file handle and inode attributes of a corresponding object in the remote file system.

10. The computer program product of claim 9, wherein a cache manager functions as a file system with the remote cluster file system that is used as a source of data that is fetched on demand into the local cluster file system.

11. The computer program product of claim 10, further comprising:
opening, by the remote cluster file system, a locally accessed file remotely prior to access;
closing, by the remote cluster file system, the file after access; and
performing, by the remote cluster file system, a read or write using a same name used when the file was opened locally.

12. The computer program product of claim 9, wherein the caching layer function includes an application node configured to select an input/output (I/O) node based on a hashing function to ensure requests for an object are always sent to a same I/O node, and the selected I/O node is configured to convert a General Parallel File System (GPFS) lookup request to a network file system (NFS) lookup request and forwards the converted request to the remote cluster file system to obtain file information.

13. The computer program product of claim 12, further comprising:
creating, by the I/O node, the object in the cache via the cache manager;
associating, by the I/O node, a mapping between a local GPFS inode and the remote cluster file system state;
providing, by the I/O node, an obtained file handle and attributes of the object to the application node; and
returning, by the I/O node, a success status back to the application node.

14. The computer program product of claim 13, wherein fetching file data on demand from the remote cluster file system occurs over a network, the local file data corresponds to file data in the remote cluster file system, the applications are configured to access, update, traverse a directory tree for the remote cluster file system even when the remote cluster file system is offline; and the caching layer function comprises the cache manager, multiple gateway nodes and multiple application nodes, and the cache layer function is integrated into a local General Parallel File System cluster file system.

15. A method for facilitating access to data, the method comprising:

providing a caching layer function that is configured to integrate into a local cluster file system and to use distributed locking for data cache;

caching, by the caching layer function, local file data in a cache based on fetching file data on demand from a remote cluster file system;

operating, by the caching layer function, on a multi-node cache cluster; and associating a cache state with every object in the multi-node cache cluster to access remote data consistently from the remote cluster file system, wherein the cache is visible to file system clients as a Portable Operating System Interface (POSIX) compliant file system, applications execute on the multi-node cache cluster using POSIX semantics via a POSIX compliant file system interface, the data cache is locally and remotely consistent for updates made at the multi-node cache cluster using the distributed locking for the data cache, and the cache state includes a network file system (NFS) file handle and inode attributes of a corresponding object in the remote file system.

16. The method of claim 15, wherein a cache manager functions as a file system with the remote cluster file system that is used as a source of data that is fetched on demand into the local cluster file system.

17. The method of claim 16, further comprising:

opening, by the remote cluster file system, a locally accessed file remotely prior to access;

closing, by the remote cluster file system, the file after access; and performing, by the remote cluster file system, a read or write using a same name used when the file was opened locally.

18. The method of claim 15, wherein the caching layer function includes an application node configured to select an input/output (I/O) node based on a hashing function to ensure requests for an object are always sent to a same I/O node, and the selected I/O node is configured to convert a General Parallel File System (GPFS) lookup request to a network file system (NFS) lookup request and forwards the converted request to the remote cluster file system to obtain file information.

19. The method of claim 18, further comprising:

creating, by the I/O node, the object in the cache via the cache manager;

associating, by the I/O node, a mapping between a local GPFS inode and the remote cluster file system state;

providing, by the I/O node, an obtained file handle and attributes of the object to the application node; and returning, by the I/O node, a success status back to the application node.

20. The method of claim 19, wherein fetching file data on demand from the remote cluster file system occurs over a network, the local file data corresponds to file data in the remote cluster file system, the applications are configured to access, update, traverse a directory tree for the remote cluster file system even when the remote cluster file system is offline; and the caching layer function comprises the cache manager, multiple gateway nodes and multiple application nodes, and the cache layer function is integrated into a local General Parallel File System cluster file system.

\* \* \* \* \*